Patented Oct. 22, 1929

1,732,903

UNITED STATES PATENT OFFICE

SYLVAN R. MERLEY, OF DOVER, NEW JERSEY, ASSIGNOR TO DOHERTY RESEARCH COMPANY, OF NEW YORK, N. Y., A CORPORATION OF DELAWARE

SEPARATION OF HEAVY ALCOHOLS FROM POLYMERS

No Drawing.    Application filed March 26, 1926.  Serial No. 97,599.

The present invention relates to the separation of heavy alcohols from a solution mixture of such alcohols and olefin polymers. It is well-known that in the process of forming alcohols by absorbing olefins in a mineral acid and afterward hydrolyzing the esters formed, the alcohols obtained are originally contaminated by a certain amount of polymers formed from the olefins. The alcohols formed by the process just mentioned are principally secondary alcohols.

In a co-pending application, filed of even date herewith, Ser. No. 97,600, for method for production of alcohols from olefins, I have disclosed and claimed a method of removing polymers from a mixture of alcohols by dissolving the polymers in heavy alcohols, hexyl alcohol, or heavier alcohol than hexyl or a mixture of hexyl and heavier alcohols. The polymer-heavy-alcohol-solution is readily separated from the main body of alcohols, as it rises to the surface and can be readily decanted from it.

The heavy alcohols having more than five carbon atoms in their molecules are, however, quite valuable and it is obviously desirable to recover the alcohols from the alcohol-polymer solution.

It has been proposed in a co-pending application filed by Robert M. Isham to separate polymers from alcohols by treating the polymer-alcohol solution with benzene sulfonic acid to dissolve the alcohol and thereafter separating the polymers from the benzene sulfonic-alcohol solution. The benzene sulfonic acid method just mentioned produces a fairly sharp separation between the polymers and the alcohols when the polymer-alcohol solution mixture contains certain alcohols or when certain alcohols are present. I have found however by experiment that when the polymer-alcohol solution contains no alcohols having less than five carbon atoms in their molecules treatment with benzene sulfonic acid does not produce a good separation between such heavy alcohols and the polymers.

According to the present invention, solutions of polymers in alcohols having a wide range of percentage composition and in which the alcohols are composed of molecules having at least five carbon atoms may be separated sharply into alcohol and polymer fractions. This separation is produced by thoroughly mixing the solution of polymers and heavy alcohols with a solvent menstruum comprising benzene sulfonic acid and a water-soluble alcohol. The action is essentially one of solution of the alcohols in the benzene sulfonic acid menstruum, and it is found that the greater the percentage of alcohols present in a given heavy alcohol-polymer solution, the larger proportion of a given menstruum required to effect a complete separation. Also the larger the proportion of alcohols in the polymer-alcohol solution, the greater the percentage of water soluble alcohol desirable in the benzene sulfonic acid menstruum. The volume ratio of acid menstruum to alcohol necessary for a sharp separation may therefore vary from 1:1 to more than 4:1 depending upon the percentage of heavy alcohols in the solution being treated. The gravity of the acid and the test of the water-soluble alcohol employed also affects the ratio of solvent menstruum to alcohol polymer solution necessary for good results. Owing to these variations, the only satisfactory rule for determining the ratio of the solvent menstruum to be added to a given polymer-alcohol solution when operating according to the present invention is to make a laboratory test to determine the minimum ratio for a given menstruum and alcohol polymer solution. However, almost any amount of acid menstruum containing any percentage of water-soluble alcohol produces some separation of polymers from a solution of polymers in hexyl or heavier alcohol. The addition of excess of acid menstruum above that required to give a good separation does no harm except to increase the volume of acid-alcohol solution to be afterward distilled. When the benzene sulfonic acid and water-soluble alcohol mixture is added to the heavy alcohol solution, some of the polymers are thrown out of solution and rise to the surface as a distinct layer. In order to produce the separation, only so much agitation is required as is necessary to thoroughly mix the solutions added to each other. In order to determine whether or not all the polymers have been thrown out of a given polymer-heavy alcohol solution, it is necessary only to add more of the benzene sulfonic acid-water-soluble alcohol mixture to the polymer-heavy alcohol solution under treatment. If such addition of benzene sulfonic acid-water-soluble alcohol mixture increases the thickness of the polymer layer, it is evident that the amount of benzene sulfonic acid and water-soluble alcohol first added is insufficient to cause a sharp separation of the polymers from the heavy alcohols under treatment. Another rough test by which the degree of separation of polymers from the polymer-alcohol solution under treatment may be judged is to dilute the solution under treatment with a considerable volume of water. If the diluted solution turns milky, polymers are still present in the alcohols and the degree of turbidity is an indication of the amount of polymers so retained by the alcohol.

The polymer layer thrown out of solution from the heavy alcohols by the benzene sulfonic acid menstruum is readily decanted from the homogeneous body of liquid below it. The body of solution comprising the benzene sulfonic acid, heavy alcohol and water-soluble alcohol can then be distilled to separate the heavy alcohol or alcohols from the remainder of the mixture. The heavy alcohols of more than five carbon atoms being insoluble in water, they can be separated roughly from the benzene sulfonic acid and water-soluble alcohol by extensive dilution of the mixture with water.

An example of a successful separation of polymers from heavy alcohols according to the present invention is as follows:

A solution containing approximately 80% of hexyl alcohol and 20% of polymers was thoroughly mixed with a menstruum consisting of 1/3 part by volume of 90.5% isopropyl alcohol to one part by volume of benzene sulfonic acid having a gravity of 1.1. The benzene sulfonic acid menstruum mixed with isopropyl alcohol was added to the polymer-heavy alcohol solution in the ratio of volume to volume and after thorough mixing, gave a substantially complete separation of polymers from alcohol.

Other water-soluble alcohols such as ethyl alcohol, methyl alcohol, and secondary butyl alcohol may, however, be substituted for isopropyl alcohol in the benzene sulfonic acid solvent menstruum used according to the present invention. In the ordinary case of the commercial application of the present invention, a mixture of heavy secondary and tertiary alcohols will be the material to be treated to separate it from polymers. If such a mixture of secondary and tertiary alcohols is obtained from an ordinary commercial alcohol process, it is almost sure to contain amyl alcohol and such amyl alcohol may be removed and separated from the polymers in a heavy alcohol-polymer solution along with the hexyl and heavier alcohols. Amyl alcohol is not soluble in water to any marked extent and its presence in a mixture of hexyl and heavier alcohols does not avoid the necessity of adding a truly water-soluble alcohol to the mixtures of hexyl and heavier alcohols with polymers to obtain separation according to the present invention. However, a solution comprising essentially amyl alcohol and polymers may be successively treated by benzene sulfonic acid without the addition of any water-soluble alcohol. The appended claims therefore are not drawn to include the separation of amyl alcohol from polymers dissolved therein unless the amyl alcohol forms part of a mixture containing a large proportion of alcohols heavier and less water-soluble than the amyl alcohol. It is interesting to note that a solution of benzene sulfonic acid of 1.1 specific gravity without addition of water-soluble alcohol was used in an effort to separate hexyl alcohol from the polymers in hexyl-polymer solution with no results whatever.

It will be understood that the term "heavy alcohols" as used in the appended claims is intended to include those alcohols having 5 or more carbon atoms in their molecules.

Having thus described my invention, I claim:

1. The method of separating heavy alcohols from a solution composed essentially of such alcohols and polymers, said polymers being of the type formed in the esterification of olefines with acids and the hydrolysis of the resulting esters or a combination of these treatments comprising dissolving the heavy alcohol in the mixture in a menstruum composed of benzene sulfonic acid and a water-soluble alcohol and decanting the polymers from the acid-alcohol solution.

2. The method of separating heavy alcohols from a solution composed essentially of such alcohols and polymers, said polymers being of the type formed in the esterification of olefines with acids and the hydrolysis of the resulting esters or a combination of these treatments comprising dissolving the heavy alcohol in the solution in a menstruum composed of benzene sulfonic acid and isopropyl alcohol.

3. The method of treating a solution composed essentially of heavy alcohols and polymers, said polymers being of the type formed in the esterification of olefines with acids and the hydrolysis of the resulting esters or a combination of these treatments comprising mixing the said solution with a menstruum composed of benzene sulfonic acid and a water-soluble alcohol, permitting the solution to stratify, and separating a surface layer from the remainder of the mixture.

4. The method of treating a solution composed essentially of heavy alcohols and polymers, said polymers being of the type formed in the esterification of olefines in acids and the hydrolysis of the resulting esters or a combination of these treatments comprising mixing the solution with a menstruum composed of benzene sulfonic acid and a water-soluble alcohol to form a surface layer of polymers, separating said surface layer from the remainder of the liquid and separating the heavy alcohol from the benzene sulfonic acid and water-soluble alcohol.

In testimony whereof I affix my signature

SYLVAN R. MERLEY.